United States Patent
Hsu et al.

(10) Patent No.: US 10,489,291 B2
(45) Date of Patent: Nov. 26, 2019

(54) GARBAGE COLLECTION METHOD FOR A DATA STORAGE APPARATUS BY FINDING AND CLEANING A VICTIM BLOCK

(71) Applicant: Goke US Research Laboratory, Santa Clara, CA (US)

(72) Inventors: Yen-Lan Hsu, Santa Clara, CA (US); Bo-Shian Hsu, Santa Clara, CA (US); Po-Chien Chang, Santa Clara, CA (US)

(73) Assignee: Goke US Research Laboratory, Santa Clara, CA (US)

( * ) Notice: Subject to any disclaimer, the term of this patent is extended or adjusted under 35 U.S.C. 154(b) by 11 days.

(21) Appl. No.: 15/877,547

(22) Filed: Jan. 23, 2018

(65) Prior Publication Data

US 2019/0227925 A1 Jul. 25, 2019

(51) Int. Cl.
*G06F 12/02* (2006.01)
*G06F 3/06* (2006.01)

(52) U.S. Cl.
CPC .......... *G06F 12/0253* (2013.01); *G06F 3/064* (2013.01); *G06F 3/0652* (2013.01); *G06F 3/0679* (2013.01); *G06F 12/0246* (2013.01); *G06F 2212/2022* (2013.01); *G06F 2212/7201* (2013.01); *G06F 2212/7205* (2013.01)

(58) Field of Classification Search
CPC .... G06F 12/0253; G06F 3/064; G06F 3/0652; G06F 12/0246; G06F 3/0679; G06F 2212/7201; G06F 2212/2022; G06F 2212/7205
See application file for complete search history.

(56) References Cited

U.S. PATENT DOCUMENTS

| | | | | |
|---|---|---|---|---|
| 10,055,130 B2* | 8/2018 | Kanno | ................ | G06F 3/0604 |
| 2013/0097210 A1* | 4/2013 | Amit | ................ | G06F 12/0253 |
| | | | | 707/813 |
| 2015/0324284 A1* | 11/2015 | Kim | ................ | G06F 12/0246 |
| | | | | 711/103 |
| 2017/0083436 A1* | 3/2017 | Jung | ................ | G06F 12/0246 |
| 2017/0139826 A1* | 5/2017 | Sugimori | ........... | G06F 12/0246 |
| 2017/0337001 A1* | 11/2017 | Lee | ................ | G06F 3/0626 |
| 2018/0173464 A1* | 6/2018 | Wongso | ............ | G06F 3/0659 |
| 2018/0336129 A1* | 11/2018 | Hutchison | ........... | G06F 12/0269 |
| 2018/0357157 A1* | 12/2018 | Byun | ................ | G06F 12/0246 |
| 2019/0087326 A1* | 3/2019 | Wang | ................ | G06F 12/02 |

* cited by examiner

*Primary Examiner* — Tasnima Matin
(74) *Attorney, Agent, or Firm* — Alan D. Kamrath; Karin L. Williams; Mayer & Williams PC

(57) ABSTRACT

A data storage apparatus executes a garbage collection method. The data storage apparatus includes a NAND flash memory including blocks each of which includes pages. In the garbage collection method, a destination block is selected from the blocks. Mapping tables and a relevance bitmap are built before writing user data into the destination block. Each bit in the relevance bitmap is related to one of the mapping tables. A victim block is selected from the blocks. At least one of the mapping tables are read according to the relevance bitmap for the victim block. It is determined whether the pages, one after another, of the victim block are in the read mapping tables. The page is set to be a valid page if a page of the victim block is in a read mapping table. Data in the valid pages is written into another block.

5 Claims, 8 Drawing Sheets

NAND Flash Memory

| Block 0 | Page 0 | Spare 0 |
| | Page 1 | Spare 1 |
| | Page 2 | Spare 2 |
| | Page 3 | Spare 3 |

| Block 1 | Page 0 | Spare 0 |
| | Page 1 | Spare 1 |
| | Page 2 | Spare 2 |
| | Page 3 | Spare 3 |

FIG. 2

Block 1000

| PPN | data |
|---|---|
| 0 | x |
| 1 | y |
| 2 | z |
| 3 | |

Block 2000

| PPN | data |
|---|---|
| 0 | |
| 1 | |
| 2 | |
| 3 | |

FIG. 3

Block 1000

| PPN | data |
|---|---|
| 0 | x |
| 1 | y |
| 2 | z |
| 3 | x' |

Block 2000

| PPN | data |
|---|---|
| 0 | |
| 1 | |
| 2 | |
| 3 | |

FIG. 4

Block 1000

| PPN | data |
|---|---|
| 0 | |
| 1 | |
| 2 | |
| 3 | |

Block 2000

| PPN | data |
|---|---|
| | |
| 1 | y |
| 2 | z |
| 3 | x' |

FIG. 5

GARBAGE COLLECTION METHOD FOR A DATA STORAGE APPARATUS BY FINDING AND CLEANING A VICTIM BLOCK

BACKGROUND OF INVENTION

1. Field of Invention

The present invention relates to a data storage apparatus and, more particularly, to a garbage collection method for a data storage apparatus.

2. Related Prior Art

A flash translation layer ("FTL") is a firmware algorithm executed in a flash memory. Flash memories include NOR flash memories and NAND flash memories. The follow discussion will be given to an FTL (or "NFTL") for a NAND flash memory. A NAND flash memory, single-level chip ("SLC") or multi-level chip ("MLC") exhibits three properties. Firstly, a written portion of the NAND flash memory must be erased before it can be written again. Secondly, a small unit of the NAND flash memory is written or read at a time, and a large unit of the NAND flash memory is erased at a time. For example, a page is written or read at a time, and a block is erased at a time, with one block including a plurality of pages. Thirdly, a block can be erased a limited number of times. For example, a block of an SLC can be erased approximately 100000 times, and a lock of an MLC can be erased approximately 10000 times.

Referring to FIG. 1, an FTL manages a NAND flash memory, and is connected to a file system. The NAND flash memory is divided into several blocks.

Referring to FIG. 2, a block includes a number of pages and an identical number of spares. As mentioned above, for the FTL, the minimum unit for writing and reading is a page, and the minimum unit for erasing is a block. The pages store user data. Each spare can be referred to as "metadata", and stores data about a corresponding page, such as a logic address and ECC.

The FTL is used for mapping logic addresses to physical addresses. To this end, the FTL uses tables to record such relationships, thereby facilitating table-checking and writing. After writing, the FTL updates the tables. The FTL allocates spaces in a memory, and flushes data into the NAND flash memory from a table after completing the table. The blocks of the NAND flash memory can be classified into data blocks for storing the user data and map blocks for storing the tables. Referring to FIGS. 3 through 5, an example for writing and garbage collection are described. Each table includes physical page numbers ("PPN") and corresponding data to be updated.

Referring to FIG. 3, block 1000 includes data x, y and z. Block 2000 is a free block without any data filled therein.

Referring to FIG. 4, data x is updated. That is, data x' corresponding to a same logic address as data x is filled in PPN 3. Data x in PPN 0 becomes invalid. When block 1000 is full, it includes valid data and invalid data.

Referring to FIG. 5, to collect block 1000, all of the valid pages of block 1000 are written into block 2000 before block 1000 is erased. Thus, block 1000 is returned to a free block.

When the free blocks of the NAND flash memory decreases to a number, FTL activates garbage collection. At first, a victim block is selected from a data block area such as block 1000 shown in FIG. 4. Then, a destination block is selected from the data block area such as block 2000 shown in FIG. 4. Subsequently, all of the valid pages of the victim block are written into the destination block. Finally, the victim block is erased and released. This process will be repeated until the free blocks of the NAND flash memory increase to another number.

To determine whether a page in the victim block is valid or invalid, it is determined whether a physical address of the page is written in a mapping table. The page is valid if the physical address thereof is in a mapping table.

For a controller with a small RAM, the FTL cannot store all of the mapping tables in the RAM. Hence, it caches some of the mapping tables in the RAM. There are two methods for comparing the PHYSICAL ADDRESS with the mapping tables.

Firstly, the FTL writes all of the mapping tables, one after another, into the RAM from the NAND flash memory, and compares the mapping tables, one after another, with the PHYSICAL ADDRESS. The FTL will have to spend table-loading time multiplied by M if the NAND flash memory includes M mapping tables for example. This is a long period of time.

Secondly, the FTL reads the metadata of each page in the victim block to obtain logical addresses. Hence, the FTL knows what mapping tables to read from the NAND flash memory according to the logical addresses. The FTL will have to spend metadata-reading time multiplied by K plus table-loading time multiplied by L (smaller than or identical to K) if the block includes K pages, and L mapping pages must be read from the NAND flash memory for example. This is not a short period of time.

The present invention is therefore intended to obviate or at least alleviate the problems encountered in prior art.

SUMMARY OF INVENTION

It is the primary objective of the present invention to provide a data storage apparatus with a garbage collection method that requires a limited amount of resources.

To achieve the foregoing objective, the data storage apparatus includes a NAND flash memory including blocks, each of which includes pages. In the garbage collection method, mapping tables are built to map logic addresses of the user data to physical addresses and a relevance bitmap is built before writing user data into a destination one of the blocks in the NAND flash memory. Each bit in the relevance bitmap is related to one of the mapping tables. A victim block is selected from the blocks. Some of the mapping tables are read according to the relevance bitmap for the victim block. It is determined if the pages, one after another, of the victim block, are in the read mapping tables. The page is set to be a valid page if a page of the victim block is in a read mapping table. Data in the valid pages is written into another block.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein:

FIG. 2 is a simplified block diagram of a NAND flash memory used in the data storage apparatus shown in FIG. 1;

FIGS. 3 through 5 are block diagrams of two blocks of the NAND flash memory shown in FIG. 2 in different states;

DETAILED DESCRIPTION OF PREFERRED EMBODIMENT

Figure 1:
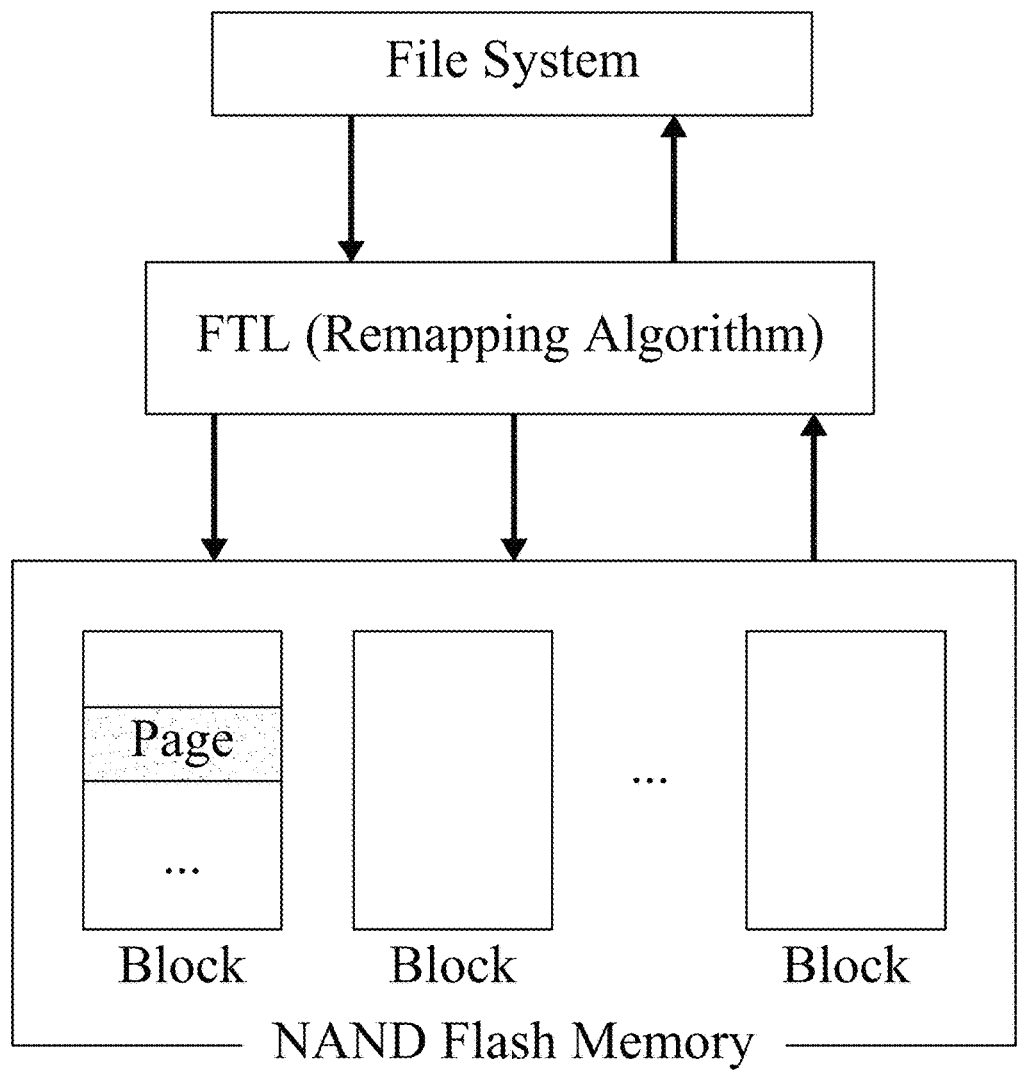
FIG. 1 is a block diagram of a typical data storage apparatus.
Figure 6:
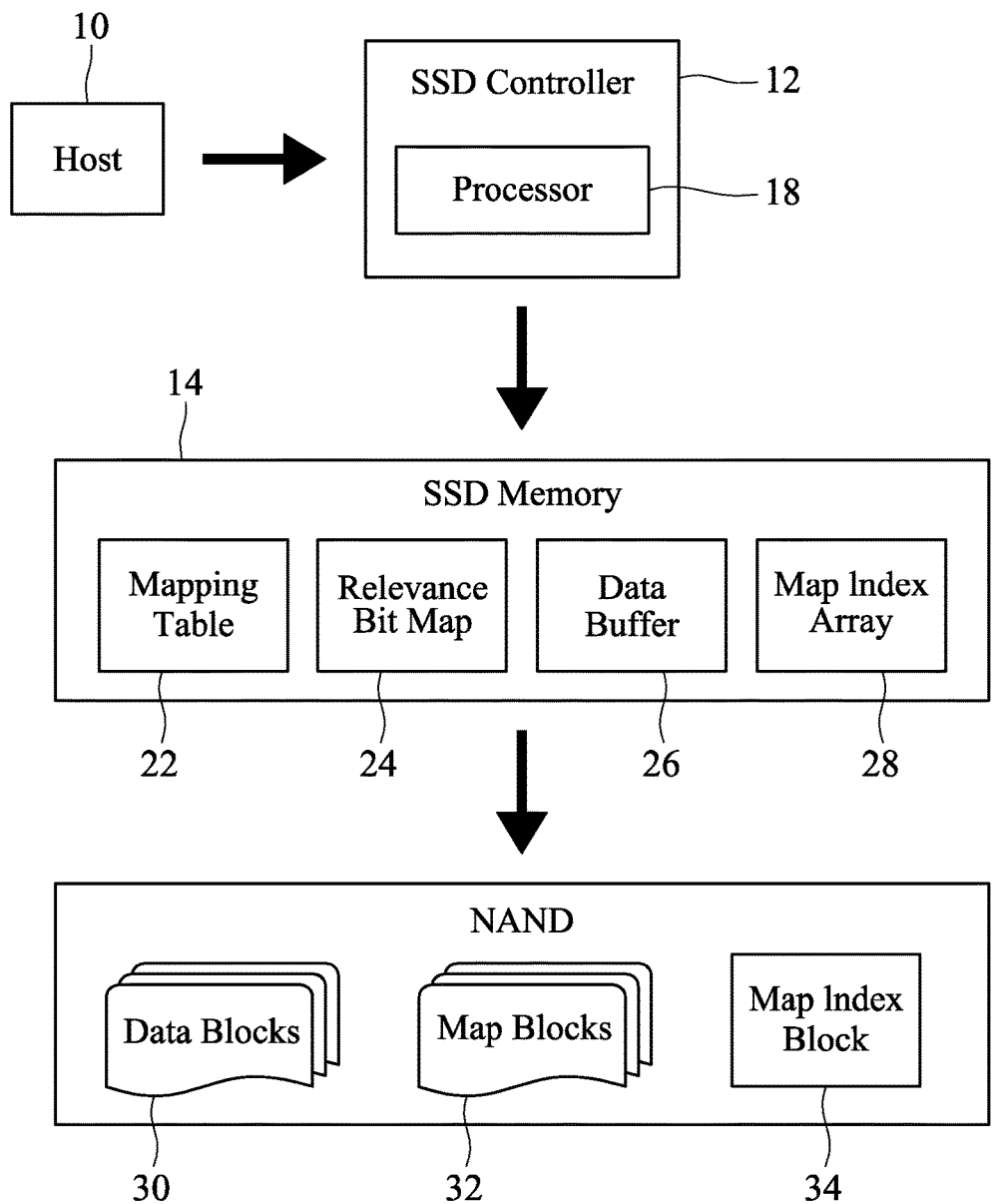
FIG. 6 is a block diagram of a data storage apparatus in a writing subroutine according to the preferred embodiment of the present invention.
Figure 7:
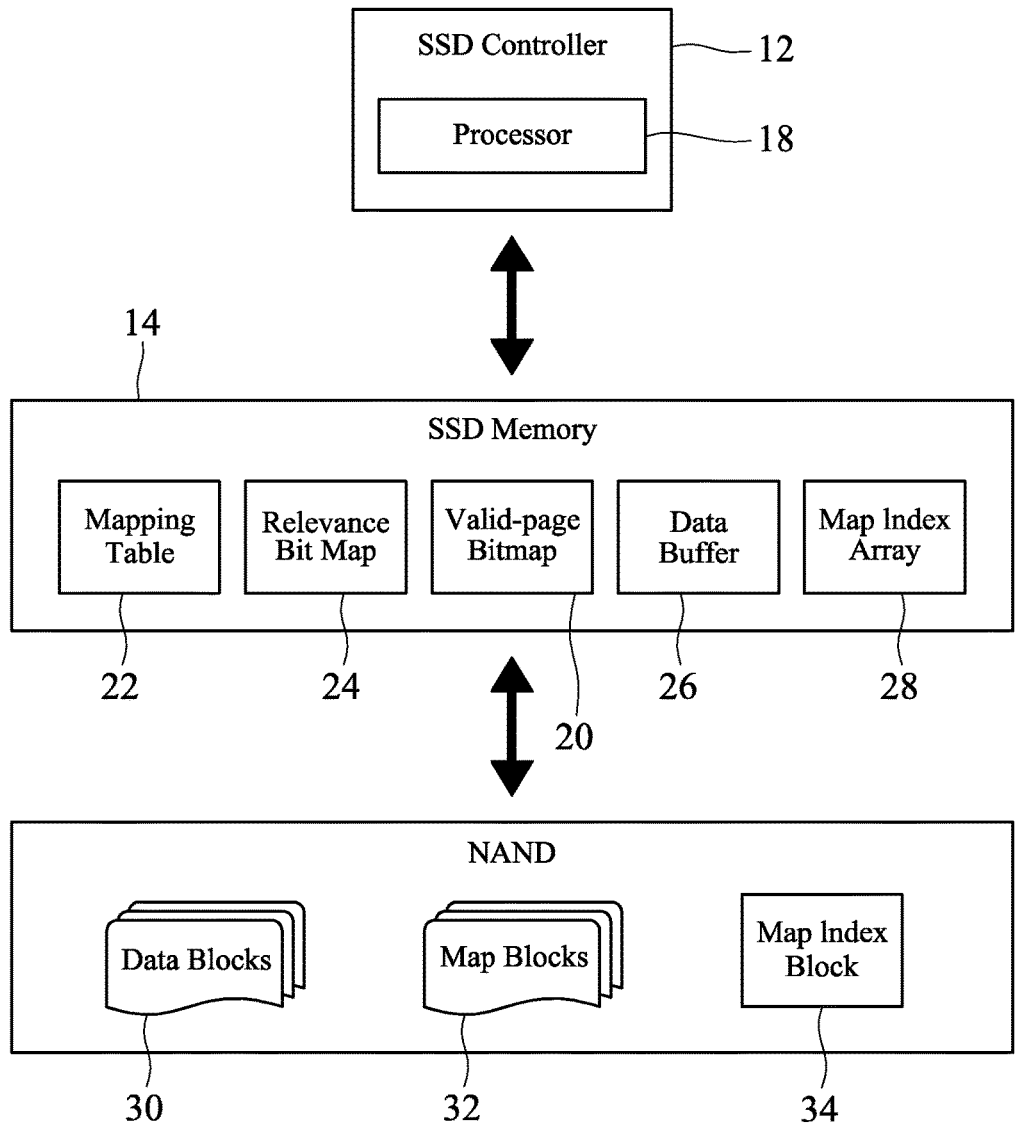
FIG. 7 is a block diagram of the data storage apparatus in a collection subroutine according to the preferred embodiment of the present invention.

Referring to FIGS. 6 and 7, a data storage system includes a host 10, an SSD controller 12, an SSD memory 14 and a NAND flash memory 16. The data storage system can use a garbage collection method according to the preferred embodiment of the present invention. The garbage collection method includes a writing subroutine and a collection subroutine.

Referring to FIG. 6, the data storage system is in the writing subroutine. In the beginning, the host 10 provides an order to write. An order to write includes user data to be written into the NAND flash memory 16.

The SSD controller 12 includes a processor 18 that executes an FTL. At any given point of time, the SSD memory 14 stores a number of mapping tables 22, a relevance bitmap 24, a data buffer 26, and a map index array 28. The NAND flash memory 16 includes a number of data blocks 30, a number of map blocks 32, and a map index block 34. The data blocks 30 are substantially identical to each other. However, the data blocks 30 are given different adjectives for playing different roles at a point of time in the garbage collection method according to the preferred embodiment of the present invention. A free data block 30 is one of the data blocks 30 without any data recorded therein. A target data block 30 is one of the data blocks 30 into which data is to be written. A victim data block 30 is one of the data blocks 30 to be erased and collected.

The mapping tables 22 store the mapping of logic addresses to physical addresses. The number of the mapping tables 22 and the size of each of the mapping tables 22 are determined by the size of the SSD memory 14.

The relevance bitmap 24 records the mapping of a corresponding one of the data blocks 30 to a number of mapping tables 22. Each bit of the relevance bitmap 24 represents a specific mapping table 22. The relevance bitmap 24 will include at least N bits if there are N mapping tables 22 for example. When the relevance bitmap 24 is initialized, all of the bits of the relevance bitmap 24 are set to be "0." The $M^{th}$ bit of the relevance bitmap 24 will be set to be "1" if the corresponding data block 30 is related to the $M^{th}$ mapping table 22 for example.

The data buffer 26 caches the user data to be written into the NAND flash memory 16 from the host 10. Once address translation is completed, and the physical addresses of the user data, the user data will be written into one of the data blocks 30 of the NAND flash memory 16 from the data buffer 26.

The map index array 28 is a table for recording physical addresses of the mapping tables 22 and that of the relevance bitmap 24. The map index array 28 will include N+K rows if there are N mapping tables 22 and K relevance bitmaps 24 for example. The map index array 28 stores the physical addresses of all of the tables in the NAND flash memory 16.

When a mapping table 22 is full of data, the data is flushed into a map block 32 of the NAND flash memory 16 from the mapping table 22, and the physical address of the mapping table 22 in the NAND flash memory 16 is updated in the map index array 28.

When a data block 30 is full of data, the data is flushed into a map block 32 of the NAND flash memory 16 from a relevance bitmap 24 related to the data block 30, and the physical address of the relevance bitmap 24 in the NAND flash memory 16 is updated in the map index array 28.

At constant time intervals, data is flushed into a certain address in the NAND flash memory 16 from the map index array 28.

The data blocks 30 receive the user data from the host 10. The map blocks 32 store the tables that include the mapping tables 22 and the relevance bitmap 24 in particular. The map index block 34 stores the physical addresses of the tables in the NAND flash memory 16.

Referring to FIG. 7, the data storage system is in the collection subroutine. The state of the data storage system shown in FIG. 7 is similar to that is shown in FIG. 6 except for several things. Firstly, the travel of the data is bi-directional. Secondly, the data buffer 26 collects data from a victim data block 30 and writes the same into a destination data block 30. Thirdly, there is a valid-page bitmap 20 in addition.

In SSD memory 14, a relevance bitmap 24 is initialized. The relevance bitmap 24 will mark the valid pages in the victim data block 30. For example, a relevance bitmap 24 corresponding to a data block 30 includes at least M bits if the data block 30 includes M pages. If the $K^{th}$ page in the victim data block 30 is valid for example, the $K^{th}$ bit of the corresponding relevance bitmap 24 is set to be "1". When a relevance bitmap 24 is initialized, all of the bits of the relevance bitmap 24 are set to be "0." After the garbage collection is completed, the space occupied by the relevance bitmap 24 is released.

Figure 8:
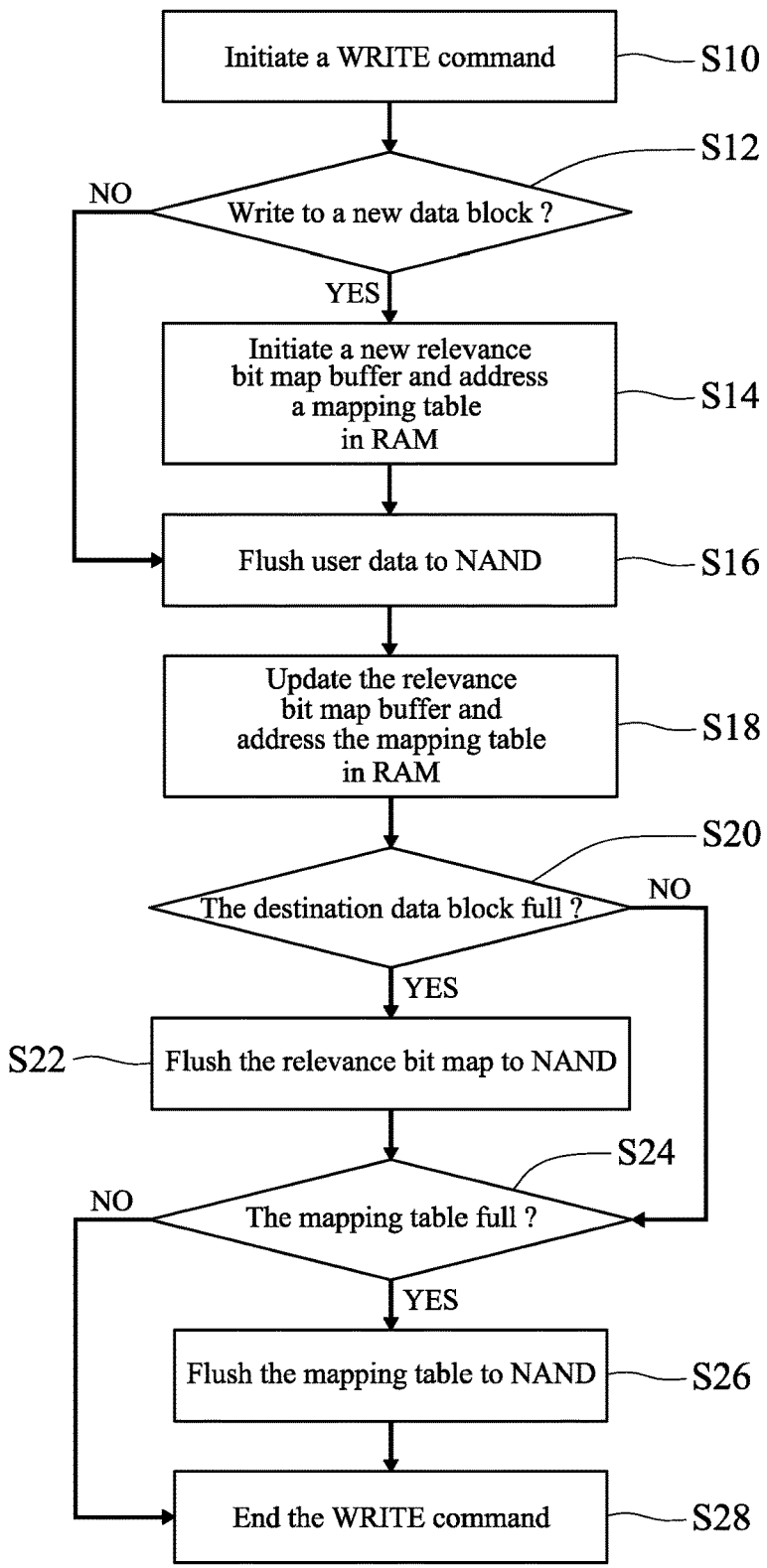
FIG. 8 is a flow chart of the writing subroutine executed in the data storage apparatus shown in FIG. 6.

Referring to FIG. 8, the writing subroutine will be described in detail. At S10, the host 10 provides an order to write. The order to write includes user data.

Before the user data is written into the NAND flash memory 16, at S12, it is determined whether if the user data are to be written into a free data block 30, i.e., determining whether if a destination data block 30 is a free data block 30. The writing subroutine goes to S14 if the user data are to be written into a free data block 30, or otherwise goes to S16. There are two reasons for writing the user data into a free data block 30. Firstly, the NAND flash memory 16 has never been written, and the user data is the first user data to be written therein. Secondly, the previous destination data block 30 is full. No matter what, at S14, a mapping table 22 and a relevance bitmap 24 are initialized in the SSD memory 14. There is no need to initialize a mapping table 22 or a relevance bitmap 24 if the destination data block 30 is not a free data block 30.

At S16, the user data is written into the data buffer 26, and the user data are flushed into the destination data block 30 in the NAND flash memory 16 from the data buffer 26 after the FTL completes the translation and the physical addresses into which the user data is to be written are determined.

At S18, the mapping tables 22 and the relevance bitmap 24 are updated in the SSD memory 14.

At S20, it is determined whether the destination data block 30 is full. The writing subroutine goes to S22 if the destination data block 30 is full, or otherwise goes to S24.

At S22, the relevance bitmap 24 is flushed into the NAND flash memory 16.

At S24, it is determined whether if the current mapping table 22 is full. The writing subroutine goes to S26 if the current mapping table 22 is full, or goes to S28.

At S26, the current mapping table 22 is flushed into the NAND flash memory 16, and the FTL writes the physical address of the current mapping table 22 is written into the map index array 28.

At S28, the writing subroutine ends.

Figure 9:
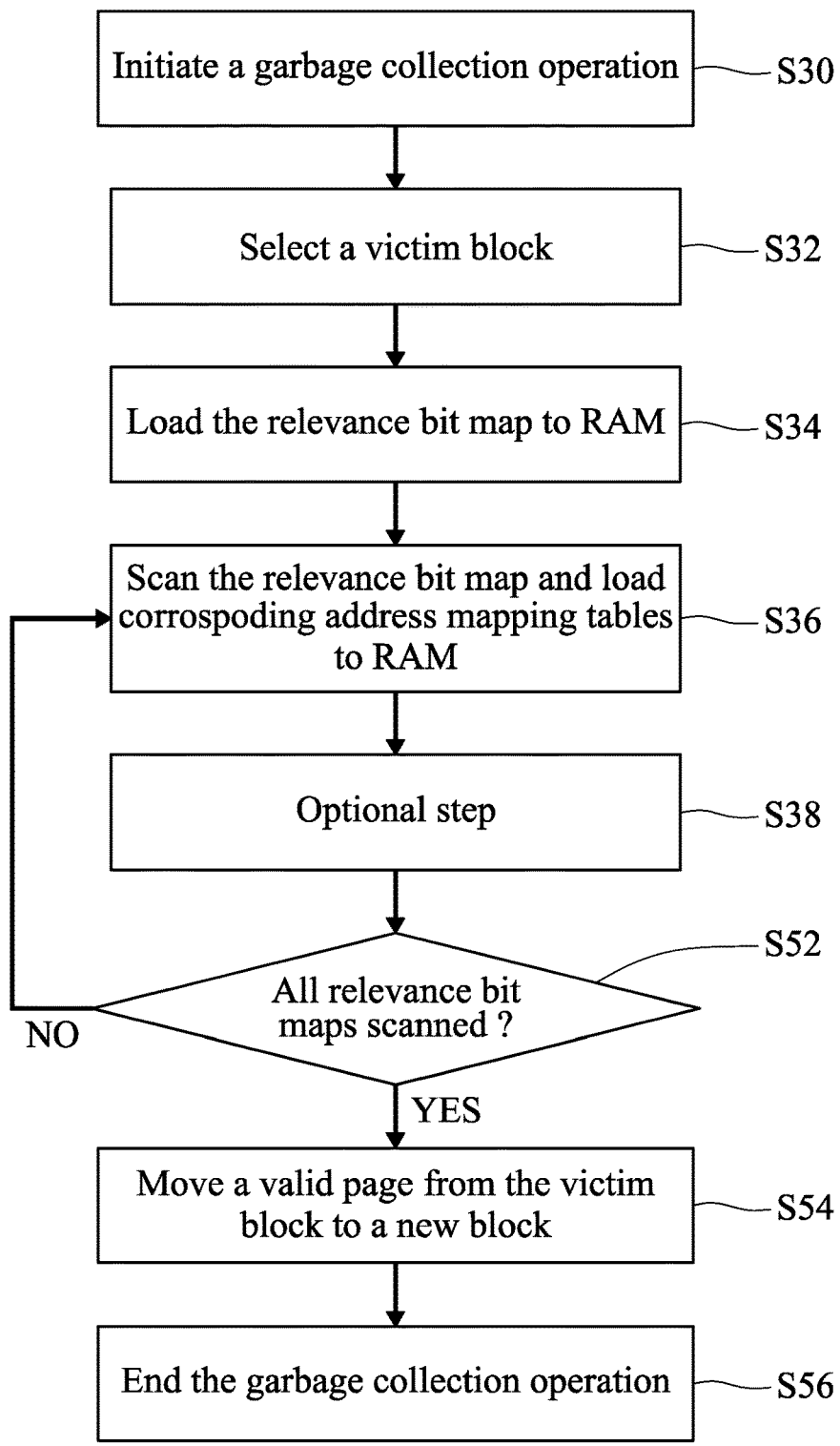
FIG. 9 is a flow chart of the collection subroutine executed in the data storage apparatus shown in FIG. 7.

Referring to FIG. 9, the collection subroutine will be described in detail. At S30, the collection subroutine is initiated when the number of free data blocks 30 decreases to a lower limit.

At S32, one of the data blocks 30 that includes the smallest number of valid pages is selected to be the victim data block 30.

At S34, the map index array 28 is checked to find the physical address of the relevance bitmap 24 corresponding to the victim data block 30, and the data of the relevance bitmap 24 is written into the SSD memory 14 from a corresponding map block 32.

At S36, the current relevance bitmap 24 is scanned to know what mapping tables 22 are related to the victim data block 30, and the physical addresses of the related mapping tables 22 are found and written into the SSD memory 14 from the NAND flash memory 16. From the data of the mapping tables 22, it can be known what pages are valid in the victim data block 30.

At S38, a valid-page bitmap 20 is built, and some of the bits of the valid-page bitmap 20 that are related to the valid pages are set to be "1." How the valid-page bitmap 20 is built will be described in detail referring to FIG. 10.

At S52, it is determined whether if all of the related mapping tables 22 have been loaded and scanned. The collection subroutine goes to S54 if all of the related mapping tables 22 have been loaded and scanned, or otherwise goes back to S36.

At S54, the valid-page bitmap 20 has been built, and from the valid-page bitmap 20, it is known what pages include valid physical addresses, and the user data is written into the data buffer 26 of the SSD memory 14 from the victim data block 30 of the NAND flash memory 16. Later, the user data will be flushed into a destination data block 30.

At S56, the collection subroutine ends because all of the valid pages of the victim data block 30 have been collected.

Figure 10:
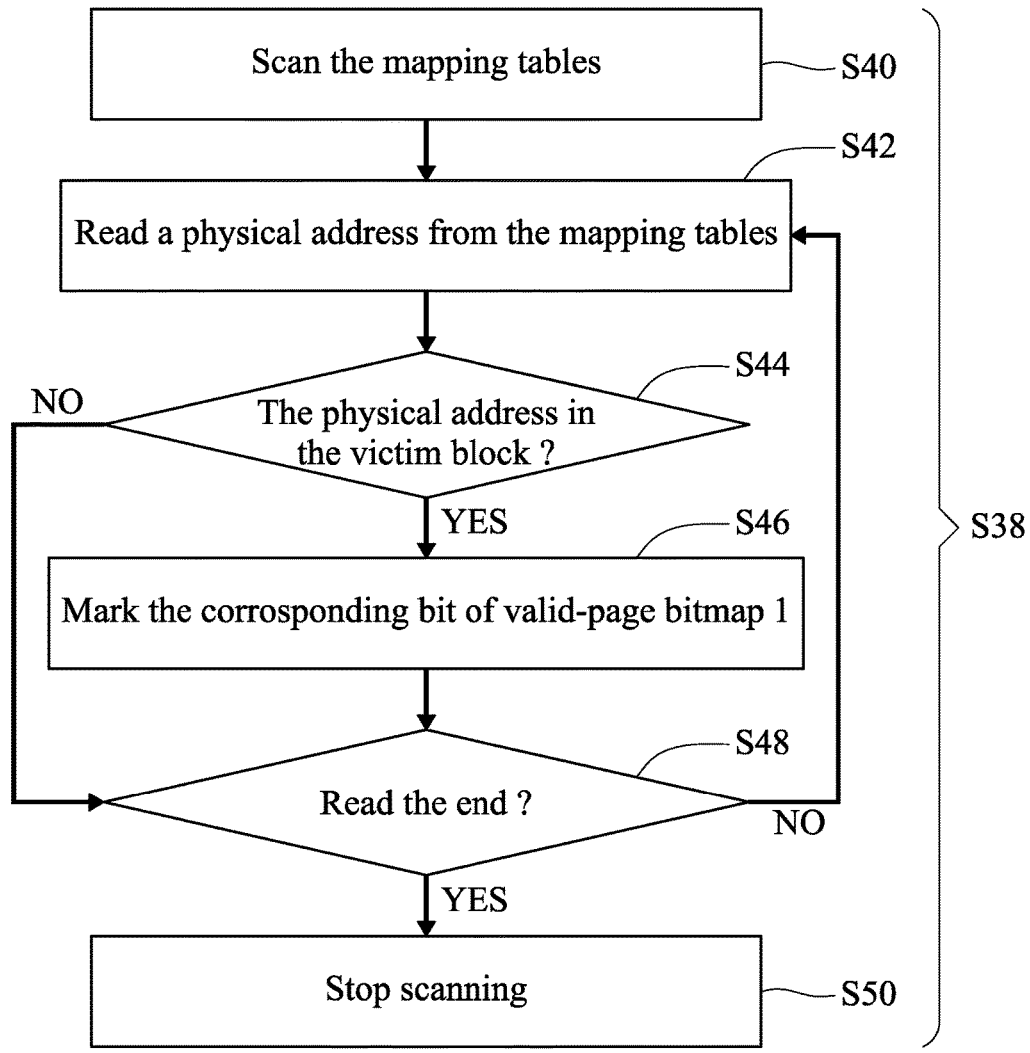
FIG. 10 is a flow chart of a portion of the collection subroutine shown in FIG. 9.

Referring to FIG. 10, how the valid-page bitmap 20 is built is described in detail. At S40, a mapping table 22 is scanned.

At S42, an entry of the current mapping table 22 is read. The value of each entry is a physical address.

At S44, it is determined whether the current physical address is in the victim data block 30. The collection subroutine goes to S46 if the current physical address is in the victim data block 30, or otherwise goes to S48.

At S46, one of the bits of the valid-page bitmap 20 that is related to the current physical address is set to be "1."

At S48, it is determined whether if the current entry is the last entry. The collection subroutine goes to S50 if the current entry is the last entry, or otherwise goes back to S42.

At S50, the scanning ends. Now, all of the entries of the current mapping table 22 have been scanned, and the valid-page bitmap 20 has been built.

The garbage collection method of the present invention is particularly useful for a data storage apparatus with a limited SSD memory. The relevance bitmap 24 is built to reduce the number of the mapping tables 22 that must be scanned, and hence the valid pages are found fast. Moreover, the valid-page bitmap 20 is built to mark the valid pages, and hence the valid pages are written into a new data block 30 from the victim data block 30.

The present invention has been described via the illustration of the preferred embodiment. Those skilled in the art can derive variations from the preferred embodiment without departing from the scope of this invention. Hence, the preferred embodiment shall not limit the scope of the present invention defined in the claims.

The invention claimed is:

1. A garbage collection method for a data storage apparatus comprising the steps of:
providing a data storage apparatus with a NAND flash memory comprising blocks each of which comprises pages;
selecting a destination block from the blocks;
building mapping tables to map logic addresses of the user data to physical addresses and building a relevance bitmap before writing user data into the destination block, wherein each bit in the relevance bitmap is related to one of the mapping tables, and the step of building the mapping tables further comprises the steps of:
determining whether if the destination block is a new block;
initializing a new relevance bitmap and a new mapping table if the destination block is a new block;
writing the user data into the destination block; and
updating the relevance bitmap and the mapping table;
selecting a victim block from the blocks;
reading at least one of the mapping tables according to the relevance bitmap for the victim block;
determining whether if the pages, one after another, of the victim block are in the mapping table that has been read;
if a page of the victim block is in the mapping table that has been read, setting the page to be a valid page; and
writing data in the valid pages into another block.

2. The garbage collection method according to claim 1, wherein the step of setting the page to be a valid page further comprises the
step of building a valid-page bitmap comprising bits each of which is related to one of the pages of the victim block.

3. The garbage collection method according to claim 2, wherein the step of building a valid-page bitmap further comprises the steps of:
setting some of the bits of the valid-page bitmap related to the valid pages to be "1"; and
setting the other bits of the valid-page bitmap to be "0".

4. The garbage collection method according to claim 1, wherein the step of building mapping tables sequentially comprises the steps of:
determining whether if the destination block is full;
writing the relevance bitmap into the NAND flash memory if the destination block is full;
determining whether if the mapping table is full; and
writing the mapping tables into the NAND flash memory if the mapping table is full.

5. The garbage collection method according to claim 1, wherein the step of building mapping tables further comprises the steps of:

setting some of the bits of the relevance bitmap related to the mapping tables to be "1"; and setting the other bits of the relevance bitmap to be "0".

\* \* \* \* \*